United States Patent
Noh et al.

(10) Patent No.: US 10,234,150 B2
(45) Date of Patent: Mar. 19, 2019

(54) FILTER DEVICE FOR AIR CONDITIONING

(71) Applicant: Samsung Electronics Co., Ltd, Gyeonggi-do (KR)

(72) Inventors: Hyung Soo Noh, Gyeonggi-do (KR); Yasuhiko Kochiyama, Gyeonggiu-do (KR); Hye Won Gil, Gyeonggi-do (KR); So Young Yun, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 191 days.

(21) Appl. No.: 15/033,871

(22) PCT Filed: Oct. 23, 2014

(86) PCT No.: PCT/KR2014/009987
§ 371 (c)(1),
(2) Date: May 2, 2016

(87) PCT Pub. No.: WO2015/064956
PCT Pub. Date: May 7, 2015

(65) Prior Publication Data
US 2016/0282000 A1    Sep. 29, 2016

(30) Foreign Application Priority Data
Nov. 1, 2013    (KR) ........................ 10-2013-0132023

(51) Int. Cl.
*F24F 3/16* (2006.01)
*F24F 13/28* (2006.01)
(Continued)

(52) U.S. Cl.
CPC .......... *F24F 3/1603* (2013.01); *B01D 46/002* (2013.01); *B01D 46/0023* (2013.01);
(Continued)

(58) Field of Classification Search
CPC combination set(s) only.
See application file for complete search history.

(56) References Cited

U.S. PATENT DOCUMENTS 2,081,553 A * 5/1937 Neeson .................. F24F 13/22
                                                    261/DIG. 34
3,630,000 A * 12/1971 Mullings .................. B03C 3/72
                                                    200/16 A
(Continued)

FOREIGN PATENT DOCUMENTS

CA      2796565 A1 * 11/2013 ........... B01D 6/0005
CN      101243292 A      8/2008
(Continued)

OTHER PUBLICATIONS

International Search Report dated Jan. 23, 2015 in connection with International Application No. PCT/KR2014/009877, 5 pages.
(Continued)

*Primary Examiner* — Duane Smith
*Assistant Examiner* — Sonji Turner

(57) ABSTRACT

Disclosed is a filter device for air conditioning in which pressure loss is low and dust collection efficiency is high. In the filter device for air conditioning installed in an air-conditioning duct, the filter device for air conditioning includes: a case; an electrical dust collection unit provided inside the case; at least one filter unit provided so as to make contact with the electrical dust collection unit; and a guide unit provided such that the electrical dust collection unit and the filter unit can be detachably installed.

14 Claims, 8 Drawing Sheets

(51) Int. Cl.
*B03C 3/04* (2006.01)
*B03C 3/45* (2006.01)
*B01D 46/12* (2006.01)
*B01D 46/50* (2006.01)
*B01D 46/00* (2006.01)
*B01D 46/42* (2006.01)

(52) U.S. Cl.
CPC ..... *B01D 46/0028* (2013.01); *B01D 46/0032* (2013.01); *B01D 46/12* (2013.01); *B01D 46/4227* (2013.01); *B01D 46/50* (2013.01); *B03C 3/04* (2013.01); *B03C 3/45* (2013.01); *F24F 3/166* (2013.01); *F24F 13/28* (2013.01)

(56) References Cited

U.S. PATENT DOCUMENTS

| | | | | | |
|---|---|---|---|---|---|
| 3,733,783 | A | * | 5/1973 | Burney | B03C 3/72 96/26 |
| 3,789,589 | A | * | 2/1974 | Delany | B01D 46/0005 55/481 |
| 3,925,043 | A | * | 12/1975 | Matrone | B01D 46/0005 55/473 |
| 4,290,788 | A | * | 9/1981 | Pittman | B03C 3/66 55/481 |
| 4,325,714 | A | * | 4/1982 | Wooldridge | B03C 3/86 96/86 |
| 4,701,196 | A | * | 10/1987 | Delany | B01D 46/0002 55/481 |
| 5,071,455 | A | * | 12/1991 | Abedi-Asl | B03C 3/017 126/110 R |
| 5,290,343 | A | | 3/1994 | Morita et al. | |
| 5,512,074 | A | * | 4/1996 | Hanni | B01D 46/0005 55/484 |
| 5,628,818 | A | * | 5/1997 | Smith | B03C 3/82 312/223.1 |
| 6,092,386 | A | * | 7/2000 | Lee | F24F 1/0007 62/317 |
| 7,332,019 | B2 | * | 2/2008 | Bias | B03C 3/025 96/15 |
| 8,105,409 | B2 | * | 1/2012 | Mann | B01D 46/0005 55/483 |
| 2007/0169448 | A1 | * | 7/2007 | Osborne | B01D 24/00 55/484 |
| 2007/0199289 | A1 | * | 8/2007 | Bland, Jr. | B01D 46/0005 55/493 |
| 2013/0291504 | A1 | * | 11/2013 | Gorman | B01D 46/0005 55/509 |

FOREIGN PATENT DOCUMENTS

| | | | | |
|---|---|---|---|---|
| EP | 2098299 | A2 | 9/2009 | |
| GB | 1102530 | A * | 2/1968 | ............... B03C 3/14 |
| GB | 1102530 | A | 2/1968 | |
| JP | H05-23615 | A | 2/1993 | |
| JP | 2000-055424 | | 2/2000 | |
| KR | 10-2000-0063929 | | 11/2000 | |
| KR | 10-2004-0080810 | | 9/2004 | |
| KR | 10-2006-0081483 | | 7/2006 | |
| KR | 10-2008-0055014 | | 6/2008 | |
| WO | 2007-022091 | A1 | 2/2007 | |
| WO | WO-2013165463 | A2 * | 11/2013 | ......... B01D 46/0005 |

OTHER PUBLICATIONS

Written Opinion of the International Searching Authority dated Jan. 23, 2015 in connection with International Application No. PCT/KR2014/09987, 6 pages.

Communication dated Jun. 22, 2017 in connection with European Patent Application No. 14 85 9085.

Communication from a foreign patent office in a counterpart foreign application, State Intellectual Property Office of the Peoples Republic of China, "The First Office Action," Application No. CN 201480059869.1, dated Jul. 18, 2018, 24 pages.

* cited by examiner

[Fig. 1]
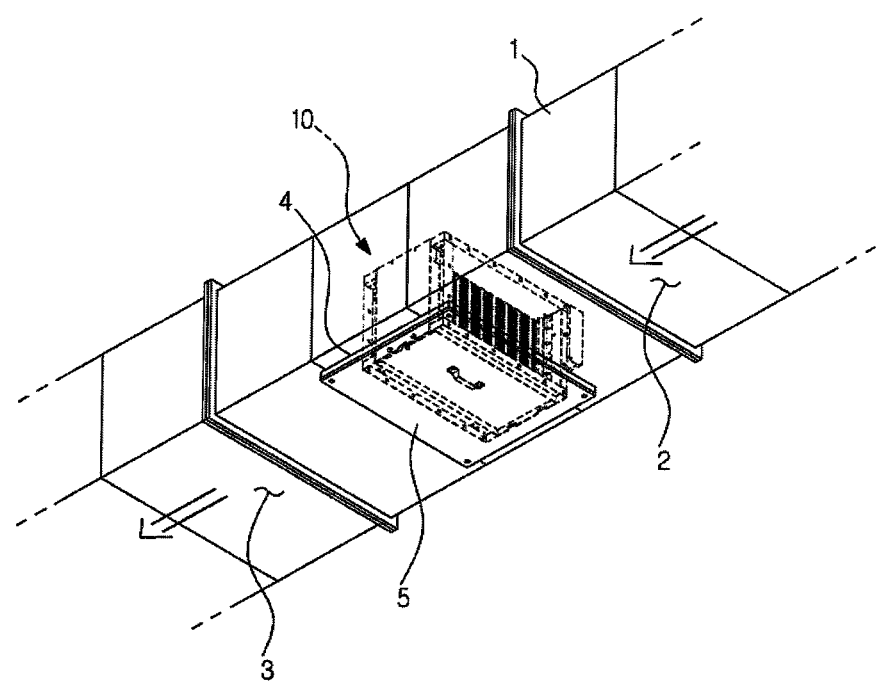

[Fig. 2]
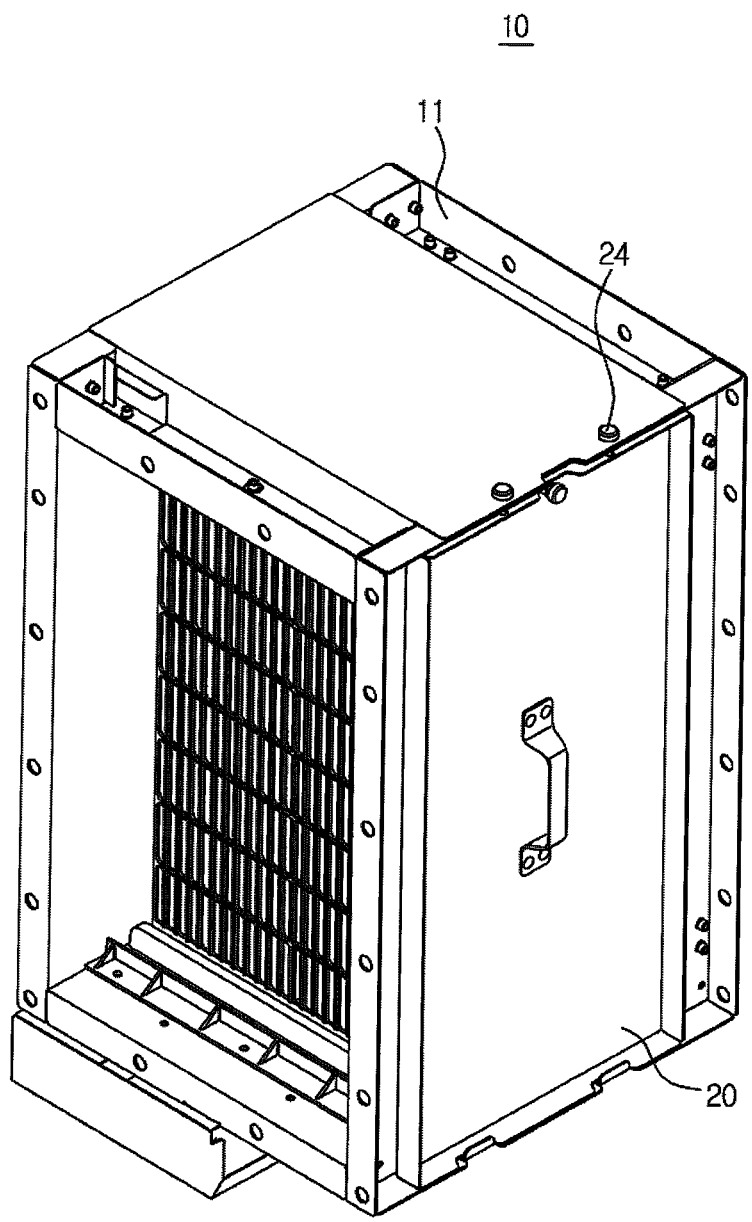

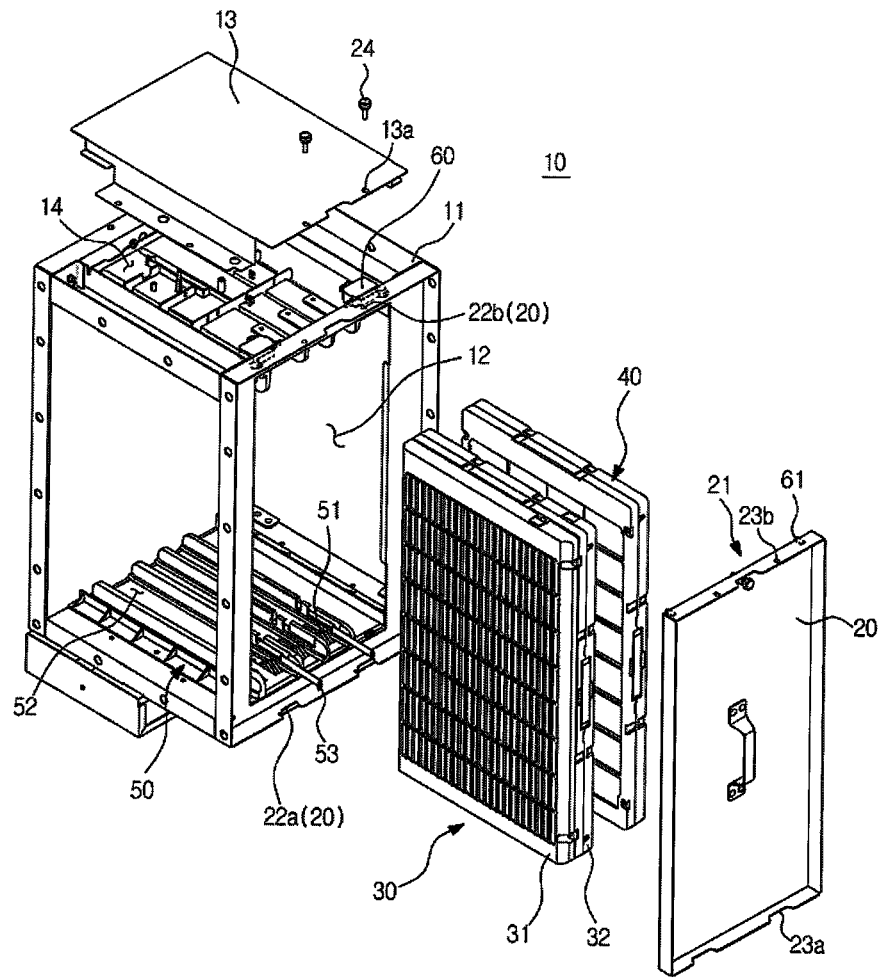
[Fig. 3]

[Fig. 4]
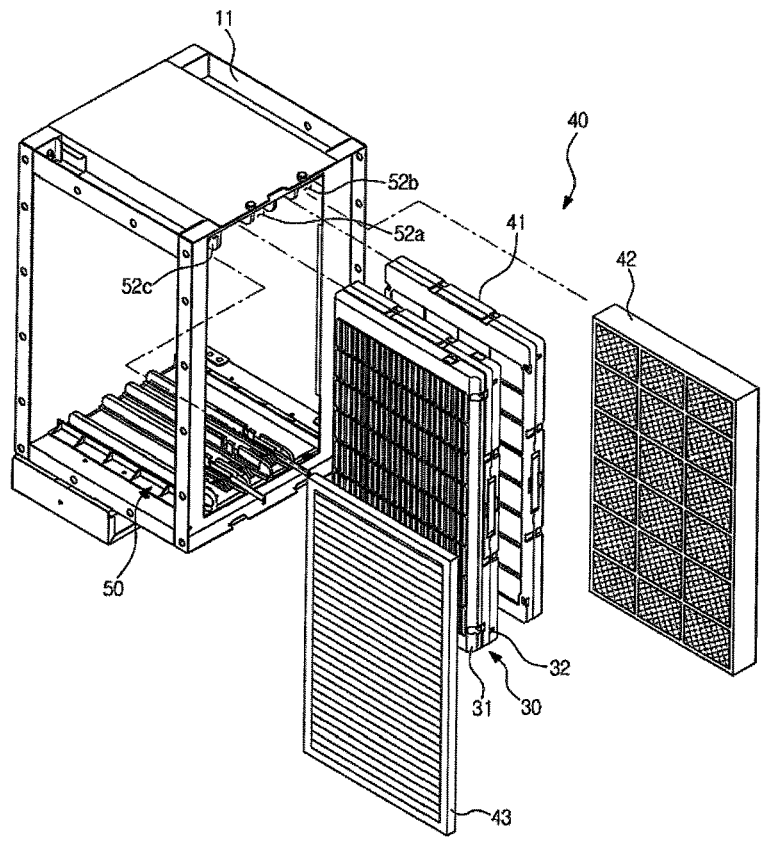
[Fig. 5]
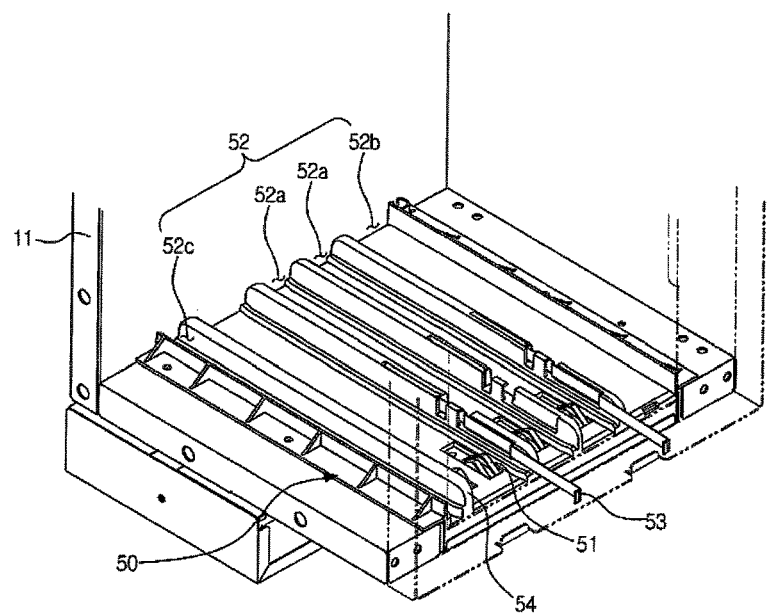

[Fig. 6]
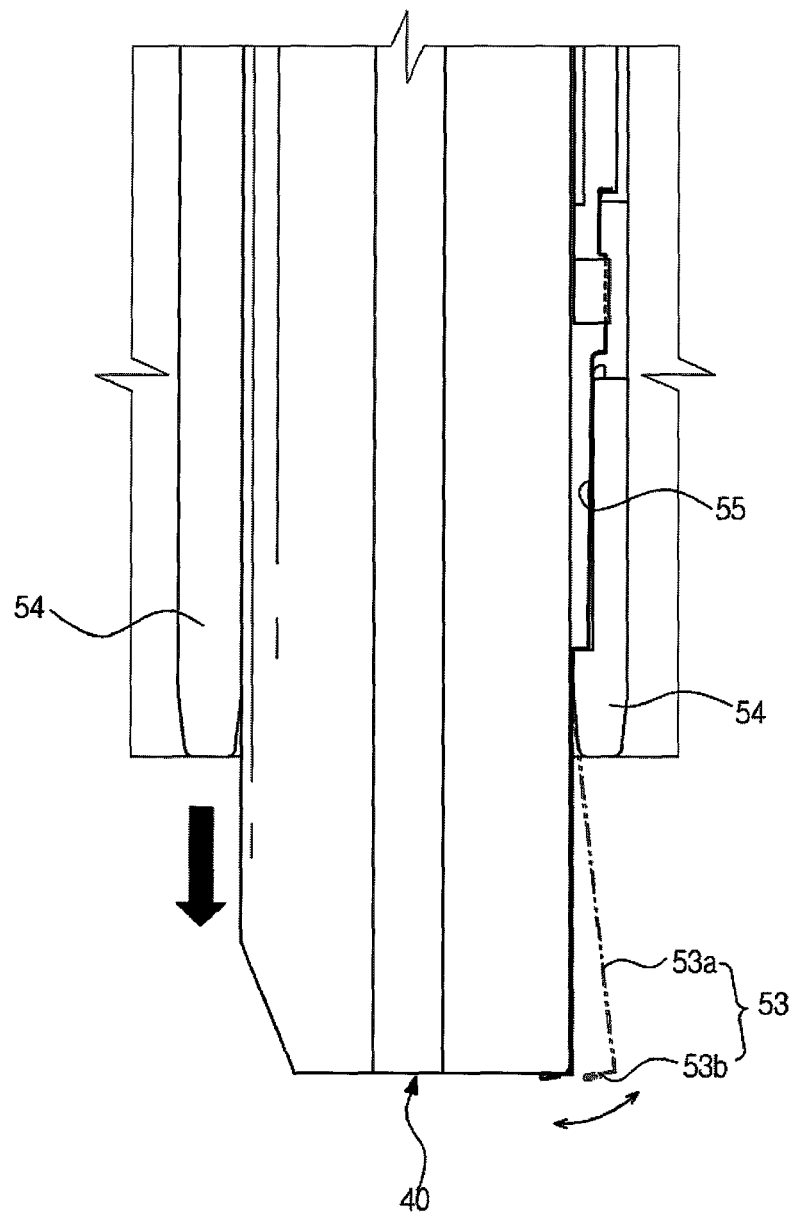

[Fig. 7]
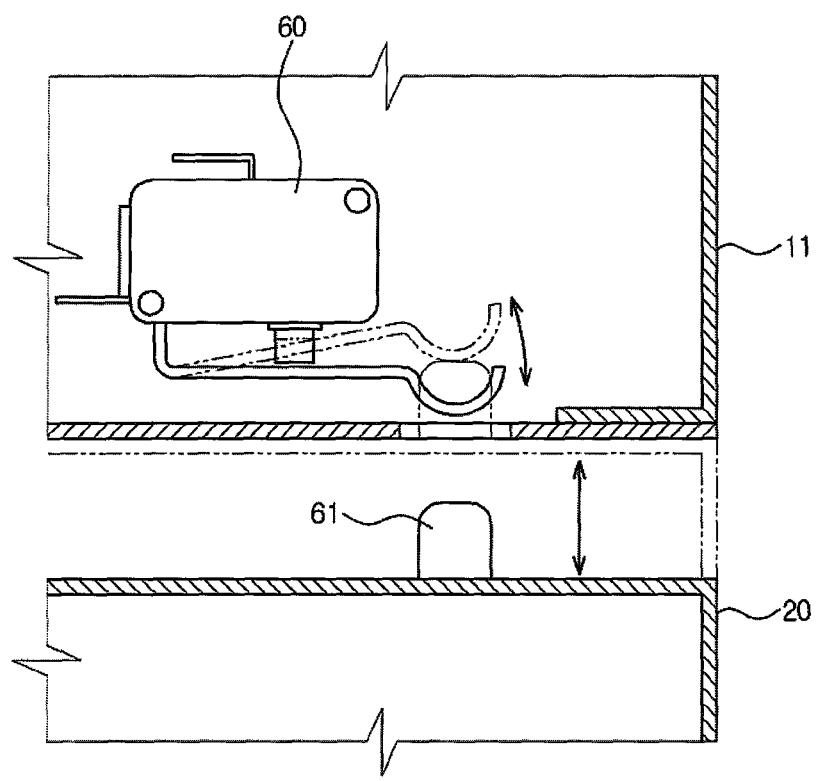

[Fig. 8]
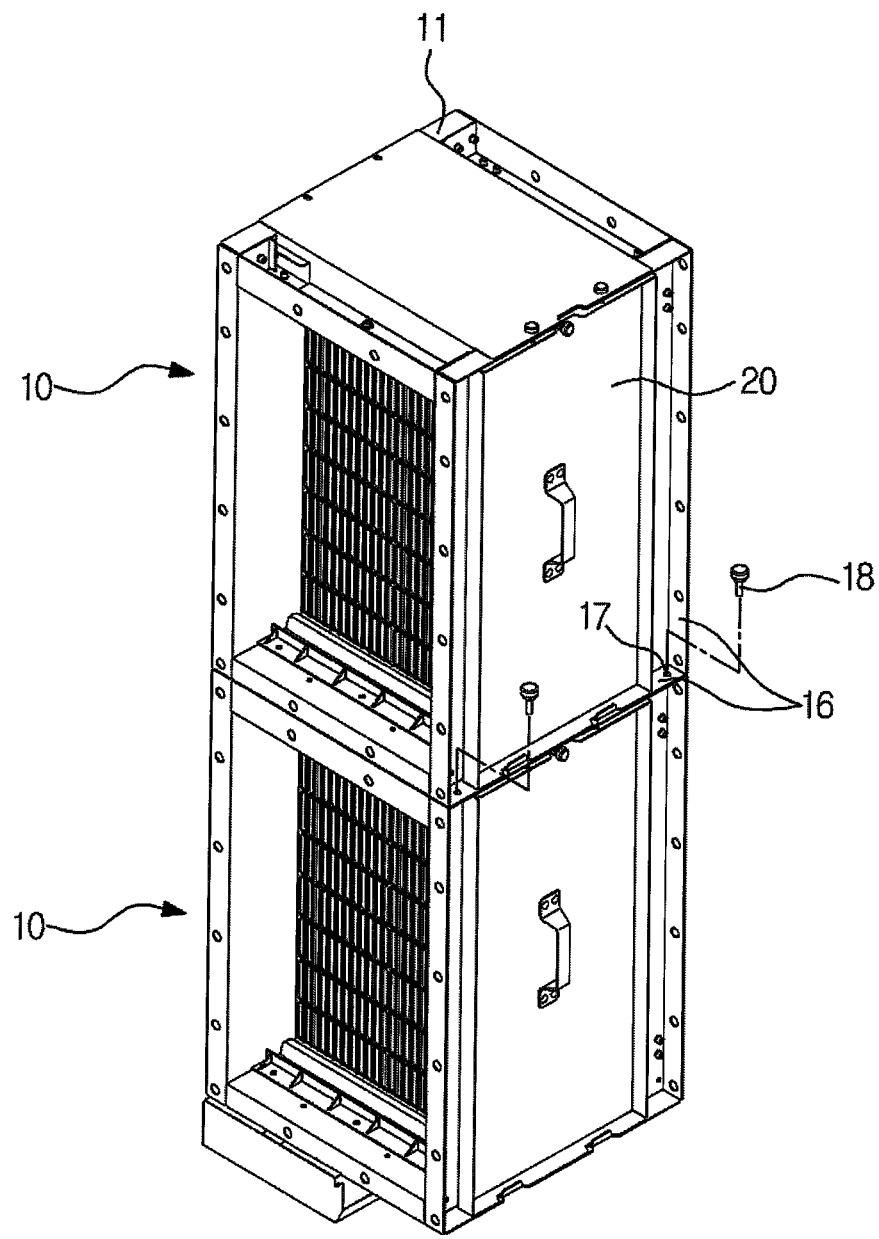

[Fig. 9]
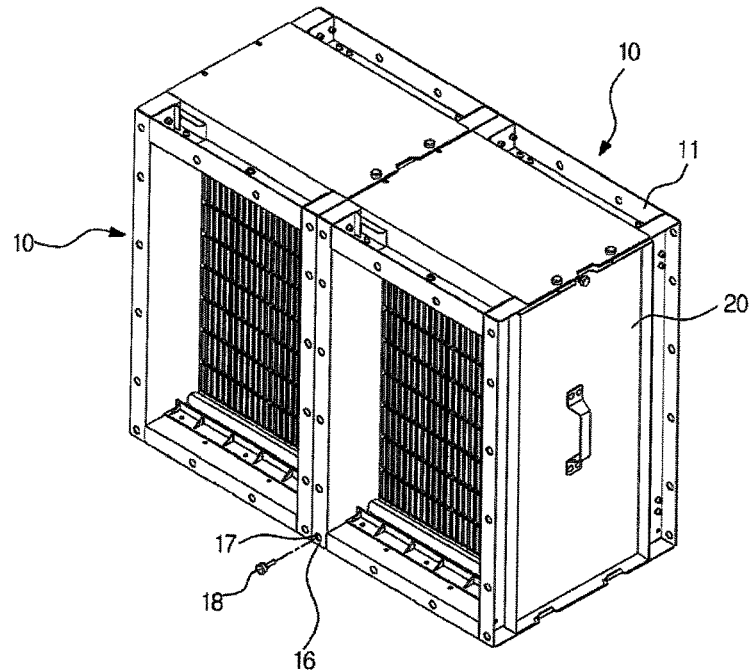
[Fig. 10]
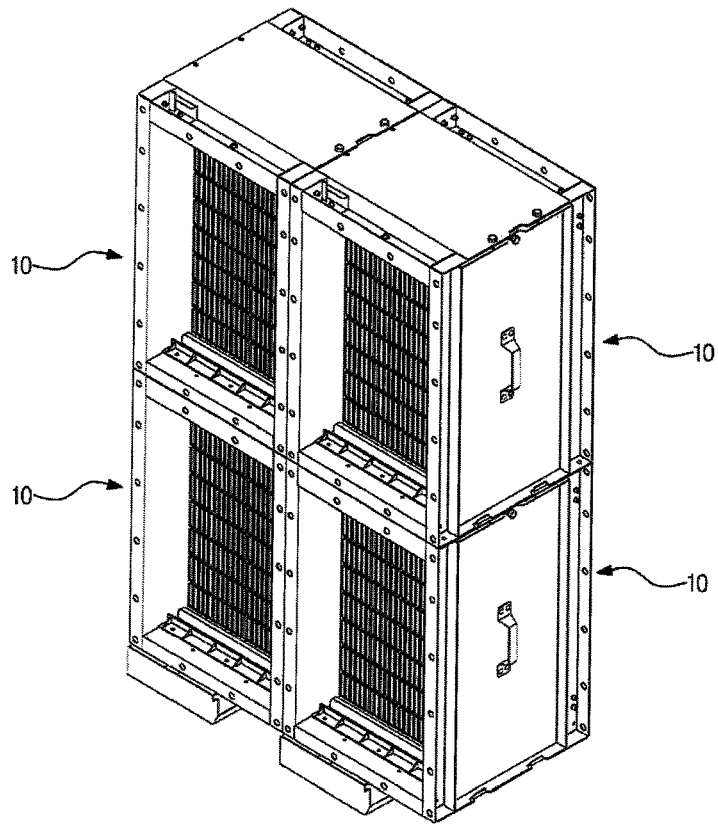

FILTER DEVICE FOR AIR CONDITIONING

TECHNICAL FIELD

The present invention relates to a filter device for air conditioning with a high dust collection efficiency while having a low loss of pressure.

BACKGROUND ART

For interior heating and cooling, a filter for purifying indoor and outdoor air is implemented in the path of an airflow in an air conditioning duct for an air conditioning system.

Since the flow capacity of ducts differs due to cross sectional areas of the ducts differing from one another, a suitable filter is selected and used according to the characteristics of each duct. Generally, high-efficiency particulate air (HEPA) class dust filtration is used for dust collection, however, because this type of filtration is easily contaminated and quickly deteriorates due to retained contaminants of the filter, regular filter replacement is required for maintaining clean indoor air. The disposal requirement for spent filters incurs an expense and is a load on the environment.

In addition, with an increase in airflow through a filter, a loss of pressure increases, and a dust collection efficiency decreases. That is, with a high airflow in an air conditioning duct, an airflow through the filter also increases, thereby causing a loss of dust collection efficiency, a loss of pressure, and a consequent increase in the load on an air conditioning fan, and the result is a large air flow that cannot be handled by a filter having a small cross sectional area.

For these reasons, in order to handle a large airflow through an air conditioning duct, there is a problem in that the cross sectional area of a filter must increase, the cross sectional area of a duct must correspondingly increase, and so the overall space occupied by an air conditioning duct inside a building increases.

DISCLOSURE

Technical Problem

The present invention is directed to providing a filter device for air conditioning with a high dust collection efficiency while having a low loss of pressure.

The present invention is also directed to providing a filter device for air conditioning in which an electric dust collection device is provided to be installable.

The present invention is further directed to providing a filter device for air conditioning in which a combination of filters is expandable in a series or parallel configuration to be usable in various air conditioning duct specifications.

Technical Solution

One aspect of the present invention provides a filter device for air conditioning installed in an air conditioning duct, wherein the filter device for air conditioning includes a case, an electric dust collection provided inside the case, at least one filter unit provided to make contact with the electric dust collection unit, and a guide unit provided such that the electric dust collection unit and the filter unit are detachably installed.

The guide unit may include an electrode portion provided such that the electric dust collection unit is installed, and at least one filter installation portion provided such that the filter unit is installed.

The filter unit may include at least one of a dust collection filter, a free filter, a high-efficiency particulate air (HEPA) filter, and an auxiliary filter.

The filter unit may include a separation prevention member installed to be elastically deformable in the filter installation portions to prevent the filter unit from being separated.

The case may include an opening formed at a side, a door capable of opening and closing the opening, and a fastener for fastening the door to the case.

The case may further include a switch to be connected to the electrode portion, and the door includes a switch pressing portion provided at an assembly point of the door for turning the switch on/off.

The case further may include an edge portion which may be connected in one of series and parallel assembly.

The edge portion may include at least one fastening hole formed such that fastening members are assembled.

The auxiliary filter may include a filter having deodorizing, antibacterial, germicidal and special air purification functions in addition to dust collecting.

Another aspect of the present invention provides a filter device for air conditioning installed in an air conditioning duct, wherein the filter device for air conditioning includes a case, an electric dust collection unit provided inside the case, at least one filter unit provided to make contact with the electric dust collection unit, and a guide unit provided such that the electric dust collection unit and the filter unit are detachably installed, wherein the guide unit includes an electrode portion provided such that the electric dust collection unit is installed and at least one filter installation portion provided such that the filter unit is installed.

The filter unit may include at least one of a dust collection filter, a free filter, and a HEPA filter.

The filter unit may include a separation prevention member installed to be elastically deformable in the filter installation portions to prevent the filter unit from being separated.

The case may include an edge portion which may be connected in one of series and parallel assembly.

The case may include an opening formed at a side, a door capable of opening and closing the opening, and a fastener for fastening the door to the case.

The case further may further include a switch to be connected to the electrode portion, and the door includes a switch pressing portion provided at an assembly point of the door for turning the switch on/off.

Advantageous Effects

An air conditioning filtration system according to an exemplary embodiment of the present invention can increase the dust collection efficiency while keeping a low loss in pressure, can use a low profile fan due to a load reduction, and thus has an effect of reducing power consumption for operating the fan to ultimately reduce overall energy consumption.

Also, the filter device for air conditioning according to an exemplary embodiment of the present invention provides for an electric dust collection unit to be installed such that the filter replacement frequency can be reduced, thus reducing the expense associated with filter replacements and the environmental load.

Furthermore, the filter device for air conditioning according to an exemplary embodiment of the present invention can be used in various air conditioning duct configurations by being expandable through a series or parallel combination of filters.

DESCRIPTION OF DRAWINGS

FIG. 1 is a view schematically illustrating a state that a filter device for air conditioning according to an exemplary embodiment of the present invention is installed in an air conditioning ventilation duct.

FIG. 2 is a perspective view schematically illustrating the filter device for air conditioning according to the exemplary embodiment of the present invention.

FIG. 3 is an exploded perspective view schematically illustrating the filter device for air conditioning according to the exemplary embodiment of the present invention.

FIG. 4 is an exploded perspective view schematically illustrating filters installed in the filter device for air conditioning according to the exemplary embodiment of the present invention.

FIG. 5 is a view schematically illustrating a guide of the filter device for air conditioning according to the exemplary embodiment of the present invention.

FIG. 6 illustrates the operation of a separation prevention member during a filter installation or removal in the filter device for air conditioning according to the exemplary embodiment of the present invention.

FIG. 7 is a view schematically illustrating an on/off operation of a switch according to an opening and closing of a door of the filter device for air conditioning according to the exemplary embodiment of the present invention.

FIGS. 8 to 10 are views schematically illustrating a assembly of series or parallel connection of filter devices for air conditionings according to the exemplary embodiment of the present invention.

MODES OF THE INVENTION

Hereinafter, exemplary embodiments of the present invention will be described with reference to the accompanying drawings.

FIG. 1 is a view schematically illustrating a state that a filter device for air conditioning according to an embodiment of the present invention is installed in an air conditioning duct, FIG. 2 is a perspective view schematically illustrating the filter device for air conditioning according to the embodiment of the present invention, FIG. 3 is an exploded perspective view schematically illustrating the filter device for air conditioning according to the embodiment of the present invention, and FIG. 4 is an exploded perspective view schematically illustrating filters installed in the filter device for air conditioning according to the embodiment of the present invention.

As illustrated in FIG. 1 to FIG. 4, an air conditioning ventilation duct 1 includes an airflow intake 2 provided for inflowing outdoor air, an air discharge outlet 3 provided for outflow of the air taken into an indoor space, and a filter device 10 for air conditioning disposed between the airflow intake 2 and the air discharge outlet 3 therein.

While the filter device 10 for air conditioning is exemplarily installed at a side of the air discharge outlet 3 in the embodiment of the present invention, concepts of the present invention are not thereby limited. For example, the filter device 10 for air conditioning may aptly be installed at an interior portion of the air conditioning ventilation duct 1 between the airflow intake 2 and the air discharge outlet 3.

The filter device 10 for air conditioning includes a case 11, an electric dust collection unit 30 disposed in the case 11, and at least one filter unit 40 provided to abut the electric dust collection unit 30.

At upper and lower portions of the case 11, an electrical part installation portion 14 is provided for electrical components (not shown) for supplying an electrical power to the electric dust collection unit 30, and a cover 13 for opening and closing the electrical part installation portion 14.

The case 11 is formed as a hexahedron and includes an opening 12 on a side thereof and a door 20 for closing and opening the opening 12. The door 20 may include a fastener 21 for fixing the door 20 at the opening 12 of the case 11.

A fastener 21 includes first fasteners 22 each provided at upper and lower positions of the case 11 and second fasteners 23 each provided at upper and lower positions of the door 20.

The first fastener 22 includes a fastener protrusion 22a protruding upward from and formed at a lower portion of the case 11, and a first fastener hole 22b formed at an upper portion of the case 11 for fastening the door 20.

The second fastener 23 includes a fastener groove 23a formed at a lower portion of the door 20 to mate with the fastener protrusion 22a at the lower portion of the case 11, and a second fastener hole 23b formed at an upper portion of the door 20.

Accordingly, the fastener groove 23a at the lower portion of the door 20 fits into the fastener protrusion 22a at the lower portion of the case 11, and by fastening the first fastener hole 22b at the upper portion of the case 11 with the second fastener hole 23b at the upper portion of the door 20 with a corresponding fixing member 24, the door 20 is fastened at the opening 12 of the case 11.

At this point, an assembly hole 13a corresponding to the first fastener hole 22b may be formed at the cover 13 of the case 11.

The case 11 is provided to be inserted into the air conditioning ventilation duct 1 and installed inside thereof, the electric dust collection unit 30 of the filter device 10 for air conditioning is disposed near the airflow intake 2 of the air conditioning ventilation duct 1, and the filter unit 40 of the filter device 10 for air conditioning is disposed near the air discharge outlet 3 of the air conditioning ventilation duct 1.

On the other hand, the air conditioning ventilation duct 1 may include an installation opening 4 for installing the filter device 10 for air conditioning and a cover unit 5 for opening and closing the installation opening 4.

The installation opening 4 may be formed to be installed at any one of the four sides of the air conditioning ventilation duct 1.

Inside the case 11, a guide unit 50 is provided such that the electric dust collection unit 30 and the filter unit 40 are detachably installed.

The guide unit 50 includes at least one electrode portion 51 provided for installation of the electric dust collection unit 30 and at least one filter installation portion 52 provided for installation of the filter unit 40.

The electric dust collection unit 30 includes an electrifier 31 for electrifying airborne dust particles and a dust collector 32 for collecting the dust particles electrified by the electrifier 31.

The electrifier 31 may include discharging electrodes configured to form electrodes with a plus polarity using a high voltage power source and counter electrodes disposed a uniform distance apart above and below the discharging electrodes to form ground electrodes and, by applying a direct current (DC) voltage to the discharging electrodes, a corona discharge is generated between the discharging electrodes and the counter electrodes. Accordingly, airborne dust particles are electrified.

It is self-evident that the electrifier 31 may employ commonly used dust electrification techniques other than the corona discharge.

The dust collector 32 is formed by alternately stacking a high voltage electrode and a low voltage electrode for collecting dust particles electrified by the electrifier 31. In addition, an electric field is established by a having high voltage electrode charged to a high plus voltage by a high voltage power source and having a low voltage electrode connected to an earth ground. As a result, when airborne dust particles are positively charged by the corona discharge in the electrifier 31, due to the Coulomb attractive force, the plus charged dust particles are collected at a relative minus side of the low voltage electrodes of the dust collector 32. On the other hand, a high voltage power source may have either a plus or minus polarity, and a pulse voltage is also obviously possible.

Accordingly, dust is sequentially removed by the electric dust collection unit 30 and the filter unit 40 of the filter device 10 for air conditioning, and since the electric dust collection unit 30 is washable, the period between filter replacements can be lengthened, and consequently expense due to filter replacement can be reduced.

FIG. 5 is a view schematically illustrating a guide of the filter device for air conditioning according to the embodiment of the present invention, and FIG. 6 is a view illustrating the operation of a separation prevention member during filter installation or removal in the filter device for air conditioning according to the embodiment of the present invention. FIG. 7 is a view schematically illustrating an on/off operation of a switch according to the opening and closing of the door of the filter device for air conditioning according to the embodiment of the present invention.

A guide unit 50 includes at least one filter installation portion 52 provided for installation of a filter unit 40. The filter unit 40 includes any one of a dust collection filter 41, a free filter 43, a high-efficiency particulate air (HEPA) filter 42, and an auxiliary filter (not shown).

These filters 41, 42, and 43 may include a high performance dust collection filter such as HEPA or ultra-low particulate air (ULPA), a middle performance filtration filter made of a nonwoven fabric, an electrostatic filter, a deodorizing filter, an antibacterial or a germicidal filter, and functional filters capable of specific functions other than those listed above.

The filter installation portion 52 according to the embodiment of the present invention may include a first filter installation portion 52a provided for installation of the dust collection filter 41 abutting a side of a dust collector 32 of an electric dust collection unit 30, a second filter installation portion 52b provided for installation of the HEPA filter 42, and a third filter installation portion 52c provided for installation of the free filter 43.

The filter installation portion 52 according to the embodiment of the present invention is illustrated to include the first filter installation portion 52a, the second filter installation portion 52b, and the third filter installation portion 52c, however, the concepts of the present invitation are not limited thereto. For example, the filter installation portion 52 may have installation portions with varied widths, so that more numerous types of filters may be installed.

The filter installation portion 52 is formed to correspond to upper and lower portions of an inside of a case 11, and the first filter installation portion 52a, the second filter installation portion 52b, and the third filter installation portion 52c may each include a guide bracket 54 for guiding an insertion of each of the filters 41, 42, and 43.

The guide unit 50 includes an electrode portion 51 for providing a high voltage to the electric dust collection unit 30.

At this point, a surface of the guide unit 50 is processed to have insulation, or preferably made of a plastic material.

In addition, to prevent a separation of the filters 41, 42, and 43 installed in the first filter installation portion 52a, the second filter installation portion 52b, and the third filter installation portion 52c, a separation prevention member 53 may be provided at the filter installation portion 52.

The separation prevention member 53 is provided disposed at one side of the guide bracket 54 provided at a lower portion of the case 11. The separation prevention member 53 is provided to be formed in a sheet form to allow elastic deformation, and to prevent the separation of the filters 41, 42, and 43 from an end of a body 53a, the body 53a formed in a sheet is provided with a stopper 53b formed bent to support a side end of the filters 41, 42, and 43.

The separation prevention member 53 is installed to be capable of sliding in and out of the guide bracket 54. In the guide bracket 54, a guide groove 55 may be formed for guiding the sliding movement of the separation prevention member 53.

The separation prevention member 53 is provided to be movable towards an opening 12 at which a door 20 of the case 11 is provided, while replacing the filters 41, 42, and 43, each of the filters 41, 42, and 43 may be released from being fixed by moving the separation prevention member 53 supporting the filter 41, 42, and 43 in an outside direction (away from filter).

Such a separation prevention member 53 may allow safer replacement of each of the filters 41, 42, and 43 in the filter device 10 for air conditioning installed in the air conditioning ventilation duct 1 in a ceiling by preventing a separation of the filters 41, 42, or 43.

Meanwhile, the case 11 further includes a switch 60 provided to connect the electrode portion 51 of the electric dust collection unit 30. The switch 60 may be disposed at an upper front end portion of the case 11.

Also, at the door 20, a switch pressing portion 61 in the form of a protrusion is provided for turning the switch 60 on/off.

Accordingly, by being linked to an opening and closing of the door 20, when the door 20 is closed, the switch pressing portion 61 of the door 20 is connected to the switch 60 to turn on the switch 60 and the electric dust collection unit 30 is operated, and when the door 20 is open, the switch pressing portion 61 of the door 20 is separated from the switch 60 to turn off the switch 60 and a power source of the electric dust collection unit 30 is shut off to stop the operation.

FIGS. 8 to 10 are views schematically illustrating a assembly of series or parallel connection of filter devices for air conditioning according to the exemplary embodiment of the present invention.

A filter device 10 for air conditioning may be provided to be installed in one of series and parallel assembly.

A case 11 of the filter device 10 for air conditioning has six sides which include opposing side surfaces and a front side with an opening 12, and may include an edge portion 16 that defines a hexahedron.

Also, the edge portion 16 may be provided to be expandable by being arranged vertically in a 1 by 2 configuration as illustrated in FIG. 8, by being arranged horizontally in a 2 by 1 configuration as illustrated in FIG. 9, or by being arranged vertically and horizontally in a 2 by 2 configuration as illustrated in FIG. 10.

The edge portion 16 has at least one assembly hole 17 provided spaced apart from each other for connecting filter devices for air conditioning 10 using assembly fasteners 18.

Such an edge portion 16 allows the case 11 to be installed in series or parallel to correspond to a width and size of a variety of air conditioning ventilation ducts 1, and thus an air flow capacity of the filter device 10 for air conditioning may be increased.

Thus, when the electric dust collection unit 30 of the filter device 10 for air conditioning is installed to be multistage, dust collection efficiency can be increased without significantly increasing pressure loss, and is thus applicable to a high airflow operation, and a reduction of cost and installation space in the air conditioning ventilation duct 1 is possible due to a reduced cross sectional area of a filter.

Also, because the dust collection efficiency is high while maintaining a low loss of pressure, the load on a fan (not shown) of the air conditioning ventilation duct 1 is reduced, the use of low profile fan is possible, and since the fan operating power is reduced, energy consumption is reducible.

Exemplary embodiments of the present invention have been described above in detail for understanding the present invention, however, as those of ordinary skill in the art can appreciate, the present invention is not limited to the exemplary embodiments described and may be implemented in various forms including employing modifications, changes, and substitutions within the scope of the invention.

The invention claimed is:

1. A filter device for air conditioning installed in an air conditioning duct, the filter device comprising: a case; an electric dust collection unit provided inside the case; at least one filter unit adjacent to the electric dust collection unit; and a guide configured to receive the electric dust collection unit and the at least one filter unit wherein the electric dust collection unit and the at least one filter unit are removable, and wherein the guide includes a separation prevention member that is elastically deformable in a direction away from the at least one filter unit and is bent to support a side end of the at least one filter unit and to prevent the at least one filter unit from being separated from the case.

2. The filter device according to claim 1, wherein the guide comprises an electrode portion configured to connect to the electric dust collection unit and at least one filter installation portion configured to receive the at least one filter unit.

3. The filter device according to claim 1, wherein the at least one the filter unit includes at least one of a dust collection filter, a free filter, a high-efficiency particulate air (HEPA) filter, and an auxiliary filter.

4. The filter device according to claim 2, wherein the case includes an opening formed at a side, a door configured to open and close the opening, and a fastener configured to fasten the door to the case.

5. The filter device according to claim 4, wherein the case further includes a switch connected to the electrode portion, and wherein the door includes a switch pressing portion provided at an assembly point of the door and the switch pressing portion is configured to turn the switch on or off.

6. The filter device according to claim 1, wherein the case further includes an edge portion that is on an external surface of the case and configured to support the case in series or parallel with respect to the air conditioning duct.

7. The filter device according to claim 6, wherein the edge portion includes at least one fastening hole formed such that a fastening member is assembled.

8. The filter device according to claim 3, wherein the auxiliary filter includes a filter including a deodorizing, an antibacterial, a germicidal and a special air purification functions in addition to dust collecting.

9. A filter device for air conditioning, comprising: a case; an electric dust collection unit provided inside the case; at least one filter unit adjacent to the electric dust collection unit; and a guide configured to receive the electric dust collection unit and the at least one filter unit wherein the electric dust collection unit and the at least one filter unit are removable, wherein the guide includes an electrode portion configured to connect to the electric dust collection unit and at least one filter installation portion configured to receive the at least one filter unit, and wherein the guide includes a separation prevention member that is elastically deformable in a direction away from the at least one filter unit and is bent to support a side end of the at least one filter unit and to prevent the at least one filter unit from being separated from the case.

10. The filter device according to claim 9, wherein each of the at least one filter unit includes a dust collection filter, a free filter, or a high-efficiency particulate air (HEPA) filter.

11. The filter device according to claim 10, wherein the at least one filter unit includes a stopper that is configured to prevent the at least one filter unit from separating, wherein the stopper is elastically deformable and positioned in at least one filter installation portion.

12. The filter device according to claim 9, wherein the case includes an edge portion that is on an external surface of the case and configured to support the case in series or parallel.

13. The filter device according to claim 9, wherein the case includes an opening formed at a side, a door configured to open and close the opening, and a fastener configured to fasten the door to the case.

14. The filter device according to claim 13, wherein the case further includes a switch connected to the electrode portion, and wherein the door includes a switch pressing portion provided at an assembly point of the door and the switch pressing portion is configured to turn the switch on or off.

* * * * *